United States Patent [19]
Cahill-O'Brien et al.

[11] Patent Number: 5,831,852
[45] Date of Patent: Nov. 3, 1998

[54] METHOD AND APPARATUS FOR LOADING A CONTROL PROGRAM INTO A REFRIGERATION SYSTEM

[75] Inventors: Barry Paul Cahill-O'Brien; Michael William Nevin, both of Syracuse, N.Y.

[73] Assignee: Carrier Corporation, Syracuse, N.Y.

[21] Appl. No.: 990,481

[22] Filed: Dec. 14, 1992

[51] Int. Cl.[6] .................................................. G06F 19/00
[52] U.S. Cl. ..................................... 364/188; 364/528.1
[58] Field of Search ..................................... 364/188, 189, 364/191, 192, 193, 528.1; 395/651, 652, 828–834, 882, 892, 893, 894

[56] References Cited

U.S. PATENT DOCUMENTS

| | | | |
|---|---|---|---|
| 4,345,132 | 8/1982 | Takase et al. .................... | 219/10.55 B |
| 4,700,296 | 10/1987 | Palmer, Jr. et al. ................... | 364/401 |
| 4,958,502 | 9/1990 | Satoh et al. ................................ | 62/126 |
| 5,228,300 | 7/1993 | Shim ............................................ | 62/80 |

OTHER PUBLICATIONS

"WordPerfect for IBM Personal Computers and PC Networks", WordPerfect Corporation, Version 5.1, pp. 3–6, 983–989, 991–994 (1990).

The Norton Utilities, Installation Guide, Version 6, Symantec Corporation, pp. 3–20 (Apr. 1991).

*Primary Examiner*—Joseph Ruggiero

[57] ABSTRACT

A programmable system for controlling the refrigeration of a transportable container is provided. The system is programmed by insertion of a card into the control system so as cause a control program to be transferred from the card to a memory within the control system.

25 Claims, 3 Drawing Sheets

METHOD AND APPARATUS FOR LOADING A CONTROL PROGRAM INTO A REFRIGERATION SYSTEM

BACKGROUND OF THE INVENTION

This invention relates to the control of a refrigerating system used in the transport of refrigerated products. More particularly, this invention relates to the method and apparatus for loading a control program into a microprocessor based control system for controlling the aforementioned refrigerating system.

Systems for controlling the refrigeration of perishable goods in transit have previously included programmed microprocessors. These microprocessor based control systems have usually included control programs which define the control functions for controlling the refrigerating system. These control functions include by way of example compressor control algorithms and defrost control algorithms. The above control functions are implemented in accordance with a control program after the program has been selectively read into the microprocessor.

The control program usually resides on a dedicated read only memory and is typically booted or read into the microprocessor at such times as the control system is activated. In order to change the control program in the aforementioned microprocessor based control system, it is usually necessary to disassemble a portion of the control system housing and thereafter physically remove the read only memory. These memories are then usually replaced with a newly programmed read only memory containing the new control program for the microprocessor based control system.

What is needed is a microprocessor based control system for a refrigerated transport system wherein the control program may be provided to the system in a more cost effective and less complicated manner.

SUMMARY OF THE INVENTION

Accordingly it is an object of the present invention to provide a control system wherein the control program is provided in a manner that does not require inserting or replacing a programmed read only memory within the control system.

As a further object of the present invention, a control program is provided to the system in a manner which does not require physically disassembling the control system.

The above and other objects of the present invention are achieved by providing a control system with a versatile card reader which is capable of reading a control program residing on a card. In accordance with the preferred embodiment, the card is inserted into the card reader in such a manner as to activate a microprocessor which proceeds to read the control program residing on the card. The thus read program is transferred to a target memory associated with the microprocessor. Upon removal of the card, the microprocessor will access the thus transferred control program from the target memory and begin to execute the control functions for controlling the refrigerating system. In the event that the control program is to be revised, a card containing a newly revised program is merely inserted into the card reader for subsequent transfer to the target memory associated with the microprocessor.

BRIEF DESCRIPTION OF THE DRAWINGS

Other objects and advantages of the present invention will be apparent from the following detailed description in conjunction with the accompanying drawings, in which.

DESCRIPTION OF THE PREFERRED EMBODIMENT

Figure 1:
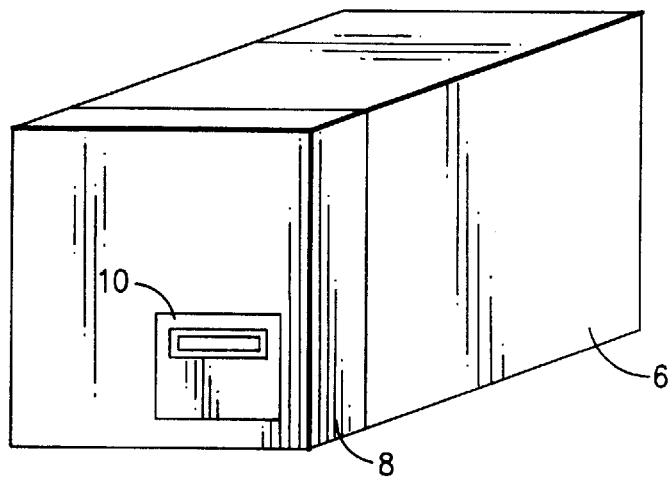
FIG. 1 illustrates a refrigerated transport system having a container vessel and refrigerating system attached thereto.

Referring to FIG. 1, a system which may be transported by land or sea is seen to include a transport container 6 and a refrigerating system 8 attached thereto. A control system associated with the refrigerating system is accessed by opening a hinged door 10.

Figure 2:
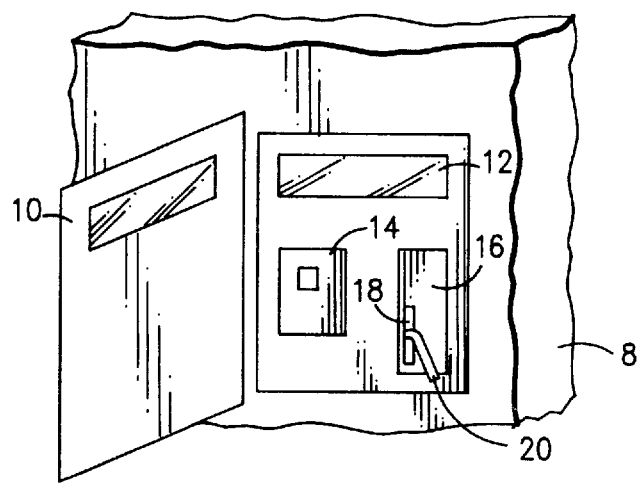
FIG. 2 illustrates certain controls available to a person wishing to program a control system associated with the refrigerating system of FIG. 1.

Referring now to FIG. 2, the control system behind the hinged door 10 is seen to include a display 12 and a keypad entry 14. The control system furthermore includes a housing 16 having a slot 18 therein. The slot 18 is preferably covered by a tape 20 which normally seals the slot 20 except when the control system is to receive a control program. In accordance with the preferred embodiment, the tape 20 is removed when it is desired to insert a card containing a control program to be loaded into the control system. Upon loading of the control program into the control system, a new tape 20 is subsequently applied to the slot 18. The new tape 20 will contain information identifying the control program that has been thus loaded into the control system. This information would for instance include the control program revision number.

Figure 3:
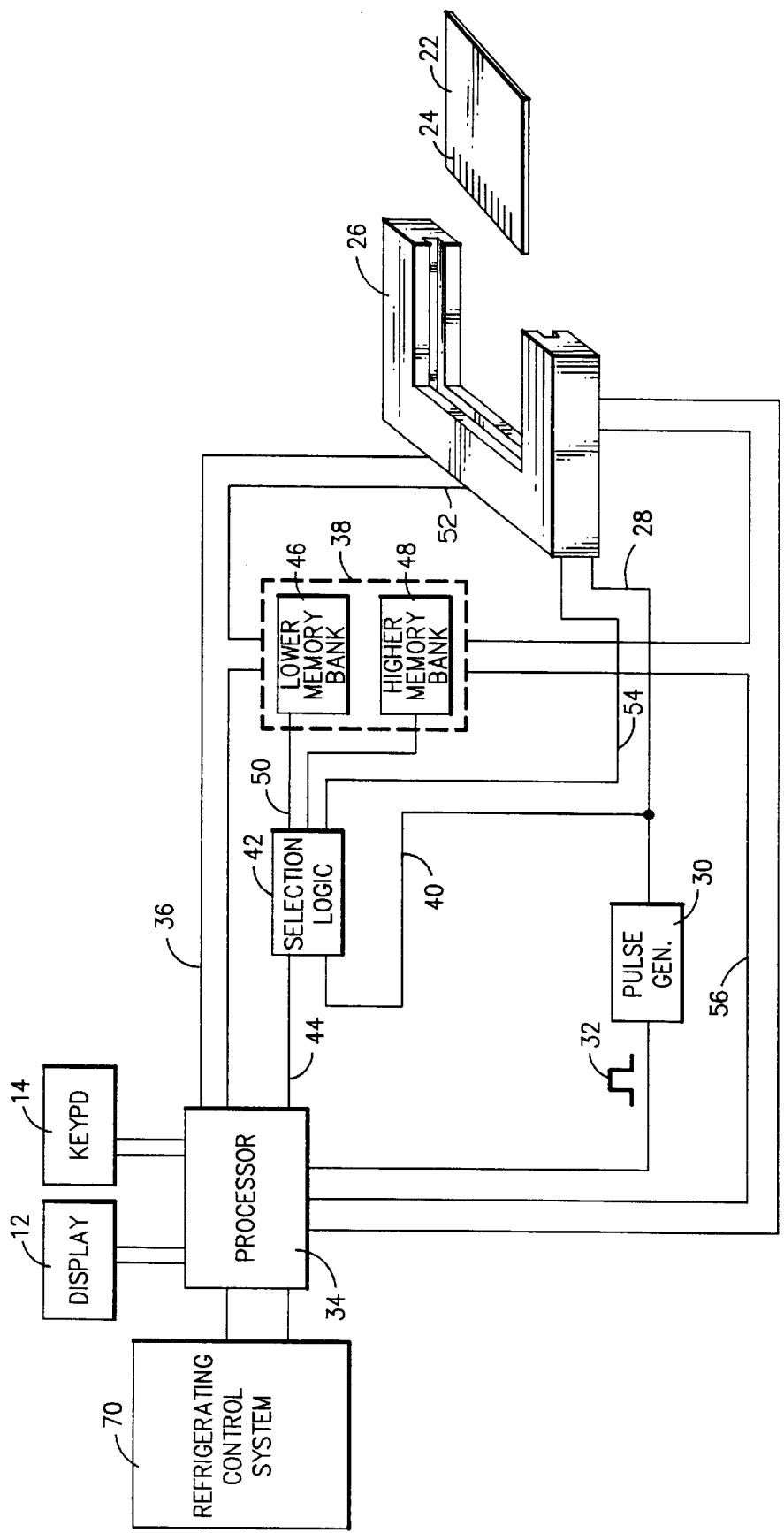
FIG. 3 illustrates a card reading system in association with a microprocessor which facilitates the transfer of a control program for the control system.

Referring now to FIG. 3, a card 22 having a plurality of electrical contacts 24 is inserted into a card reading device 26 that is located behind the slot 18. The electrical contacts 24 are caused to register with electrical sensors within the card reader 26. One of the electrical contacts on the card 22 registers with an electrical sensor associated with a line 28. This particular contact is preferably interconnected with another contact on the card 22 that receives the power supply voltage from the card reading device 26. This interconnection causes a logically high signal to occur on the line 28 when the card is completely inserted. The logically high signal on the line 28 triggers a pulse generator 30 to generate a pulse 32 that is applied to a microprocessor 34. In this regard, the pulse generator preferably generates the pulse 32 anytime there is a change in signal state from low to high or high to low at its input.

The microprocessor 34 in response to the pulse 32 generates a preset address over an address bus 36 to a memory system 38 and to the card reader 26. The address that is preset in the microprocessor identifies the first addressable storage location for the control program when it resides in the memory system 38. It identifies the address of a first location of a copy program in the card reader 26. Referring again to the line 28, the logically high signal from the card reader 26 indicating that a card 22 is in place will also be applied via a line 40 to selection logic 42. The selection logic 42 also receives a signal from the microprocessor 34 via a line 44 which is preferably the highest ordered address bit from the microprocessor 34.

The microprocessor 34 in combination with the selection logic 42 addresses storage locations in either a lower ordered addressable memory bank 46 or a higher ordered addressable memory bank 48 within the memory system 38 or it addresses storage locations in the card reader 26. The particular storage locations which are addressed will be a function of the bi-level signal present on the line 44 as well as the bi-level signal present on the line 40. The actual selective enabling of the lower ordered addressable memory bank 46 is via a line 50 whereas the selective enabling of the higher ordered addressable memory bank 48 will be via a line 52. The enabling of the card reader 26 will be via a line 54. The signal levels present on the lines 50, 52 and 54 in response to the signal levels present on the lines 40 and 44 are dictated by the selection logic 42 and can be summarized as follows:

| LINE 40 | LINE 44 | LINE 50 | LINE 52 | LINE 54 |
|---------|---------|---------|---------|---------|
| 0 | 0 | 1 | 0 | 0 |
| 0 | 1 | 0 | 1 | 0 |
| 1 | 0 | 0 | 0 | 1 |
| 1 | 1 | 1 | 0 | 0 |

It is to be appreciated from the above table that a binary zero is equivalent to a logically low level signal on a given line and a binary one is equivalent to a logically high level signal on a given line. It is furthermore to be appreciated that the above table is easily implemented within the selection logic 42 in accordance with traditional, well understood binary logic principals.

Referring now to FIG. 3, when the line 40 is logically high indicating that a card is in place within the card reader 26, the selection logic 42 will be operative to select the lower ordered addressable memory bank 50 in response to a logically high signal present on the line 44. This is accomplished by the selection logic 42 generating a logically high level signal on the line 50 and a logically low level signal on the line 52 which enables only the lower ordered memory bank 46 within the memory system 38. On the other hand, when the microprocessor 34 wishes to access the storage locations on the card 22, it will produce a logically low level signal on the line 44 which will in turn cause the selection logic to produce only a logically high signal on the line 54. The logically high signal on the line 54 will enable the card reader 26 to respond to addressing on the address bus 36 and provide control program information to the microprocessor 34 via a data bus 56.

In summary, when the card reader 26 is indicating that a card is in place, the lower ordered memory bank 46 will be accessed by the microprocessor 34 when the address line 44 is logically high and the card reader 26 will be accessed when the address line 44 is logically low. In either case, the microprocessor will be operative to receive information from the card reader 26 and transmit information to the lower ordered memory bank 46 via the data bus 56.

Figure 4:
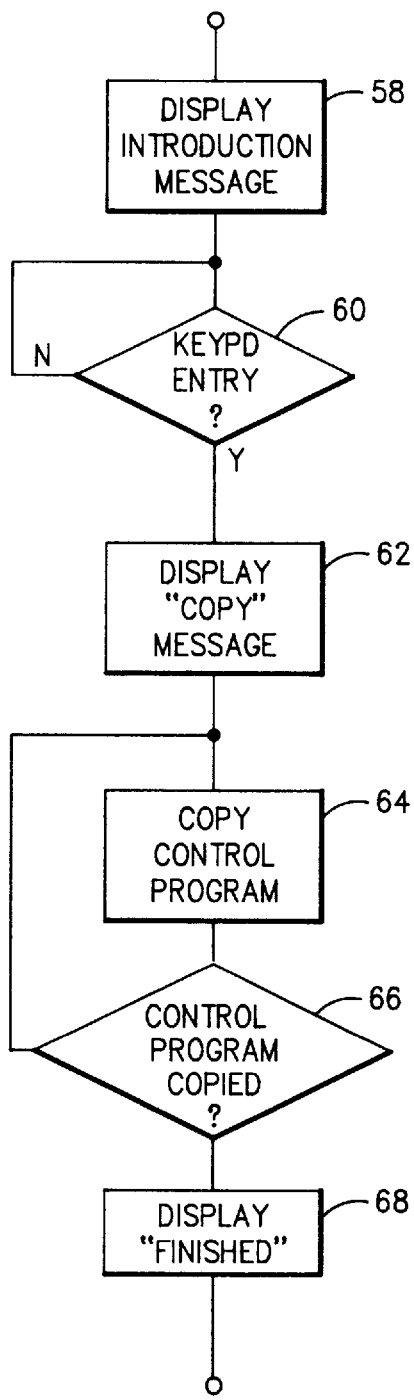
FIG. 4 is a flow chart depicting a copy program present on the card that is to be read by the card reading system of FIG. 3.

Referring now to FIG. 4, a copy program resident on the card 22 is illustrated. It is to be understood that the copy program will begin at an addressable storage location on the card 22 which is the initial address generated by the microprocessor 34 over the address bus 36 immediately following generation of a reset pulse 32 by the pulse generator 30.

The copy program begins with an introduction message that is to be displayed on the display 12 pursuant to a step 58. This introduction message will indicate to an operator that the card has been successfully inserted into the slot 20 and that the control system is now awaiting authorization to proceed forward with loading of the control program into the control system. The copy program will accordingly in a step 60 await a keyboard entry from the operator who has read the introduction message. When a keyboard entry is made, the copy program will proceed to generate a copy message on the display 12 in a step 62. The copy program thereafter proceeds in a step 64 to instruct the microprocessor to copy the control program into certain addressable storage locations. These addressable storage locations will begin with the preset address normally generated by the microprocessor upon being reset except that the highest ordered address bit will be a binary one instead of a binary zero. This highest ordered address bit will cause the microprocessor to generate a logically high signal on the line 44. The selection logic 42 will in turn generate a logically high level signal on the line 50 so as to enable the lower ordered memory bank 46 to receive the control program beginning at the preset address.

When the control program is completely copied, the copy program exits in a step 66 to a step 68 and causes the display 12 to display a message indicating "finished".

The card may be removed when the operator observes the finished message on the display 12. It is preferable at this point in time that the slot 18 be resealed with a tape 20 so as protect the electronic components within the housing 16. The tape also serves the purpose of identifying the thus loaded control program. Referring again to FIG. 3, when the card 22 is removed from the card reader 26, the signal on the line 28 will drop logically low indicating that a card is no longer in place. This will cause the pulse generator 30 to generate a second reset pulse 32 to the microprocessor 34. The thus reset microprocessor 34 will again generate the same address that has been preset in the microprocessor. This will include the bi-level signal on the line 44 being logically low. The selection logic 42 will be operative to select the lower ordered memory bank 46 in response to the card sense line 40 now being logically low. In this manner, the control program previously stored in the lower ordered memory bank 50 will now be accessed by the microprocessor 34 and thereafter implemented. It is to be understood that implementation of the control program may require use of the higher memory bank which is freely available during such time as the control program is being read from the lower memory bank.

It is to be appreciated that the microprocessor 34 when implementing the thus stored control program will interface with an overall refrigerating control system 70 so as to appropriately control the cooling of the transport container 6. This will include such functions as have been heretofore described. In the event that the control is to be revised or otherwise changed, a new control program can be loaded into the system via a card 22. In this manner, the control functions for the control system 70 can be changed, enhanced or otherwise revised without disassembling or otherwise physically disturbing any internal electronic circuits.

While the invention has been described with respect to a preferred embodiment, it will be appreciated that many modifications and changes may be made by those skilled in the art without departing from the scope of the invention. In this regard, while the invention has been disclosed relative to the cooling of a transportable container, it could also be used in a control system that cools or heats any spatial volume. It is therefore intended that the scope of the present invention be limited only by the scope of the following claims.

What is claimed is:

1. A programmable control system for controlling heating or cooling elements, said programmable control system comprising:

a programmable processor for executing a control program defining control functions for the heating or cooling elements;

a memory system associated with said processor for storing the control program to be executed by the programmable processor;

a device for receiving a card containing both the control program and a copy program containing all instructions to be executed by the programmable processor during transfer of the control program; and logic for transferring the control program from the card to said memory system upon insertion of the card into said card receiving device, said logic being responsive to the first address issued by said programmable processor following receipt of the card for addressing the first instruction of the copy program.

2. The programmable control system of claim 1 wherein said memory system comprises at least two separate memory banks and wherein said logic for transferring the control program comprises:

selection logic for selecting a particular memory bank within said memory system for storing the control program.

3. The programmable control system of claim 2 wherein said selection logic comprises:

means for receiving the highest ordered address bit from said processor:

means, responsive to the highest ordered address bit, for selecting the particular memory bank that is to receive the control program, said particular memory bank having a highest ordered address bit differing in value from the highest ordered address bit received from said processor.

4. The programmable control system of claim 3 further comprising:

a housing for said card receiving device, said housing including a slotted opening aligned with said card receiving device so as to allow a card to be inserted through said slot and into said card receiving device.

5. The programmable control system of claim 4 further comprising:

a peelable tape having information thereon identifying the control program that has been transferred, said peelable tape being of sufficient size and width to cover said slotted opening.

6. The programmable control system of claim 1 further comprising:

a housing for said card receiving device, said housing including a slotted opening aligned with said card receiving device so as to allow a card to be inserted through said slot and into said card receiving device.

7. The programmable control system of claim 6 further comprising:

a peelable tape having information thereon identifying the control program that has been transferred, said peelable tape being of sufficient size and width to cover said slotted opening.

8. The programmable control system of claim 1 wherein said logic for transferring the control program comprises:

a display, responsive to a card having been inserted into said card receiving device, for displaying a message indicating that the card has been appropriately inserted.

9. The programmable control system of claim 8 wherein said logic for transferring the control program further comprises:

a key pad entry device for entering an authorization for the transfer of the control program from said card receiving device to said memory system.

10. The programmable control system of claim 9 wherein said logic for transferring the control program further comprises:

selection logic responsive to said authorization from the key pad entry device for selecting a memory bank within the memory system for storing the control program.

11. A method for programming a control system for controlling heating or cooling elements, said method comprising the steps of:

storing a control program defining control functions for the heating or cooling elements on a card capable of being registered with a card reading device in the control system;

storing a copy program on the card containing all necessary instructions to be executed by a processor for the copying of the control program into a memory associated with the processor; and transferring the control program stored on the card to a memory internal to the control system in accordance with instructions in the copy program whereby the control system is thereafter operative to control the heating or cooling elements as defined by the thus stored control program.

12. The method of claim 11 further comprising the steps of:

displaying a message to a person who is to authorize the transfer of the control program; and awaiting an authorization from the person before transferring the control program.

13. The method of claim 11 wherein said step of transferring the control program comprises the step of:

transferring the control program to a set of addressable storage locations within the control system from which the control program can be thereafter accessed when the card is no longer registered with the card reading device.

14. The method of claim 13 further comprising the steps of:

displaying a message to a person who is to authorize the transfer of the control program;

awaiting an authorization from the person before said step of initially transferring the control program to a first set of addressable storage locations within the control system.

15. The method of claim 11 wherein the memory internal to the control system has at least two memory banks and said method further comprises the step of:

selecting a particular memory bank within said memory that is to receive the control program.

16. The method of claim 15 wherein said step of selecting a particular memory bank that is to receive the control program comprises the steps of:

receiving the highest ordered address bit from the processor; and selecting the particular memory bank that is to receive the control program upon receipt of the highest ordered address bit.

17. The programmable control system of claim 1 wherein the the processor is operative to read and execute the copy program from the card, said programmable control system furthermore including:

a display device for receiving a communication to display an introduction message from the processor executing the copy program.

18. The programmable control system of claim 17 further comprising:

a key pad entry device for entering an authorization for the transfer of the control program from said card whereby said processor executing the copy program is operative to initiate transfer of the control program upon receipt of the authorization from the key pad entry device.

19. The programmable control system of claim 18 wherein said display system is responsive to a communication from said processor executing the copy program to display a message indicating that the control program has been completely transferred.

20. The programmable control system of claim 1 wherein said logic for transferring the control program comprises:

means for receiving a highest ordered address bit from said processor; and means, responsive to receipt of the highest ordered address bit from said processor, for defining addresses of storage locations in the memory system for receipt of the control program, the addresses beginning with an address bit having a highest ordered address bit differing in binary value from the highest ordered address bit from said processor.

21. A programmable control system for controlling heating or cooling elements, said programmable control system comprising:

a programmable processor for executing a control program defining control functions for the heating or cooling elements;

a memory system associated with said processor having a plurality of addressable storage locations capable of storing the control program;

a device for receiving a card containing both the control program and a copy program containing all instructions to be executed by the programmable processor when transferring the control program to said memory system, said device being operative to generate a signal indicating when a card is fully inserted; and addressing logic, responsive to addressing from the processor and to the signal indicating full insertion of the card, for first defining an addressable storage location on the card containing the first instruction of the copy program and thereafter defining the addresses of the addressable storage locations in the memory system that are to receive the control program in accordance with instructions of the copy program stored on the card.

22. The programmable control system of claim 21 wherein said addressing logic further comprises:

logic for separately receiving the highest ordered address bit of any address being communicated by said processor to the card containing the control program; and logic, responsive to both the receipt of the highest ordered address bit and the signal indicating full insertion of the card into the card receiving device, for defining the addresses of the addressable storage locations in the memory system that are to receive the control program in accordance with instructions of the copy program stored on the card.

23. The programmable control system of claim 22 wherein said means for defining the addresses of the addressable storage locations in the memory system that are to receive the control program comprises:

logic for defining addresses having highest ordered address bits differing in value from the highest ordered address bit received from said processor.

24. The programmable control system of claim 23 further comprising:

a key pad entry device for generating a signal to said processor authorizing the transfer of the control program whereby the processor begins copying the control program from the inserted card into the addressable storage locations selected by said logic for defining addresses.

25. The programmable control system of claim 23 further comprising:

a display device, responsive to the signal indicating full insertion of the card into the card receiving device for displaying a message indicating that a card has been inserted whereby the key pad entry device may thereof the generate the signal to said processor authorizing the transfer of the control program.

* * * * *